United States Patent
Combs et al.

(10) Patent No.: US 6,756,965 B2
(45) Date of Patent: Jun. 29, 2004

(54) INPUT DEVICE HAVING TWO JOYSTICKS AND TOUCHPAD WITH DEFAULT TEMPLATE

(75) Inventors: James Lee Combs, Cary, NC (US); James A. Strothmann, Indianapolis, IN (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 09/840,343

(22) Filed: Apr. 23, 2001

(65) Prior Publication Data

US 2002/0021289 A1 Feb. 21, 2002

Related U.S. Application Data

(63) Continuation of application No. 08/474,064, filed on Jun. 7, 1995, now abandoned, which is a continuation-in-part of application No. 08/210,610, filed on Mar. 18, 1994, now Pat. No. 5,613,137.

(51) Int. Cl.$^7$ ............................. G09G 5/00; G06F 15/00
(52) U.S. Cl. ........................ 345/156; 345/161; 345/173; 178/18.01; 710/1
(58) Field of Search ............................. 345/156–183, 345/104; 273/148 B; 463/36–38; 178/18.01–18.11, 19.01–19.07; 710/1

(56) References Cited

U.S. PATENT DOCUMENTS

| | | | |
|---|---|---|---|
| 3,510,843 A | | 5/1970 | Bennett, et al. |
| 4,313,227 A | * | 1/1982 | Eder ........................... 455/617 |
| 4,575,714 A | | 3/1986 | Rummel |
| 4,589,063 A | | 5/1986 | Shah et al. |
| 4,604,690 A | | 8/1986 | Crabtree et al. |
| 4,712,213 A | | 12/1987 | Warwick et al. |
| 4,845,712 A | | 7/1989 | Sanner et al. |
| 4,924,216 A | * | 5/1990 | Leung .......................... 340/709 |
| 4,959,860 A | * | 9/1990 | Watters et al. .................. 380/4 |
| 5,014,193 A | | 5/1991 | Garner et al. |
| 5,038,320 A | | 8/1991 | Heath et al. |
| 5,059,960 A | * | 10/1991 | Rosenberg et al. .......... 340/111 |
| 5,097,506 A | * | 3/1992 | Kaiser, Jr. et al. ............ 380/25 |
| 5,193,174 A | | 3/1993 | Bealkowski et al. |
| 5,237,690 A | | 8/1993 | Bealkowski et al. |
| 5,291,585 A | | 3/1994 | Sato et al. |
| 5,311,207 A | * | 5/1994 | Kusumoto et al. .......... 345/150 |
| 5,444,192 A | * | 8/1995 | Shetye et al. ................. 178/18 |
| 5,534,893 A | * | 7/1996 | Hansen, Jr. et al. ........ 345/179 |
| 5,613,137 A | * | 3/1997 | Bertram et al. ............. 395/800 |
| 5,664,097 A | * | 9/1997 | Johnson et al. ............. 395/186 |
| 5,749,577 A | * | 5/1998 | Couch et al. ........... 273/148 B |
| 5,877,745 A | * | 3/1999 | Beeteson et al. ........... 345/156 |

FOREIGN PATENT DOCUMENTS

| | | | |
|---|---|---|---|
| WO | WO 93/17873 | * | 9/1993 |

OTHER PUBLICATIONS

"Two–Level Locking Protocol to Reduce Intersystem Communications", IBM Technical Disclosure Bulletin, vol. 33, No. 3B, Aug. 1990, pp. 281–283.

* cited by examiner

Primary Examiner—Lun-Yi Lao
(74) Attorney, Agent, or Firm—Driggs, Lucas, Brubaker & Hogg Co., L.P.A.; Carlos Munoz-Bustamante

(57) ABSTRACT

A computer system comprising a central processing unit (CPU), a memory circuit, an I/O coprocessor, and an input device comprising a touchpad and two joysticks positioned one to each side of the touchpad. The input device interfaces to the CPU via a serial data link to the I/O coprocessor. The touchpad has a default template graphic image inscribed on or in the touchpad surface and has a retainer for removably securing template overlays to be used with the touchpad instead of the default template.

38 Claims, 10 Drawing Sheets

INPUT DEVICE HAVING TWO JOYSTICKS AND TOUCHPAD WITH DEFAULT TEMPLATE

RELATED APPLICATIONS

This application is a continuation of U.S. application Ser. No. 08/474,064, filed Jun. 7, 1995 (now abandoned), which is itself a contiuation-in-part of the specification of the U.S. application Ser. No. 08/210,610, filed Mar. 18, 1994, now U.S. Pat. No. 5,613,137. This application is also related to U.S. application Ser. No. 08/210,672, field Mar. 18, 1994, now abandoned.

FIELD OF THE INVENTION

The present invention relates generally to coordinate-type pointing devices for use with digital systems and, more specifically, to an input device having a touchpad with an inscribed default template associated therewith, a retainer for removably securing template overlays to the pad surface, and a pair of joysticks positioned one to each side of the touchpad.

BACKGROUND OF THE INVENTION

Video graphics computer systems are well known, popular consumer products. A typical system includes a data processing unit that connects to an ordinary television set for displaying images of a game or other application. The data processing unit receives controlling software from a read only memory (ROM) that is usually packaged in the form of a cartridge. The cartridge is removably plugged into the data processing unit. At least one pointing device, such as a mouse, joystick, touchpad, touchscreen, switch pad, or light gun, is also connected to the data processing unit to allow the player to input positional information that is used by the controlling software to execute the application.

The data processing unit typically has a single central processing unit (CPU) and associated volatile and non-volatile memory, including all random access memory (RAM) and bootstrap read-only memory (boot ROM), a television (RF video) signal generator, and an input/output (I/O) processor to interface to the various pointing devices. These devices are in circuit communication. One distinguishing characteristic of these systems is the use of a motherboard or system planar to electrically connect these components together.

Joysticks are directional type pointing devices used to input directional data to computer systems. Joysticks typically comprise a base and an elongated "stick," which is typically gripped by the hand of the user. The "stick" typically pivots from a point at the base and has a default position perpendicular to the base. Pivotal motions of the stick away from the default perpendicular position are interpreted as a directional input parallel to the base in the direction needed to displace the stick from the default perpendicular position. Typically a button is located at the top portion of the stick. Closure events of the switch are used as control inputs for applications executing on the computer system.

Touchpads are coordinate type pointing devices used to input coordinate type data to computer systems. The touchpad is typically a pressure-sensitive bounded plane capable of detecting localized pressure at its surface. When a user touches the surface with a finger, stylus, or the like, the touchpad reports to the attached computer system the coordinates of the location touched. In response, the computer performs the function, if any, associated with the location pressed.

Typically one or more regions of the touchpad are assigned to certain functions within the system. The user is made aware of what function is associated with each region by a template. A template is a sheet with a graphic design and is typically placed over and in contact with the touchpad surface. The graphic design typically maps out regions of the touchpad surface and the regions are typically labeled to provide a reminder to the user as to the functions associated with the various mapped regions.

Touchpad systems typically either (1) have a permanent template inscribed in or on the touchpad surface and are incapable of accepting template overlays or (2) have no permanent inscribed template but have the means for accepting template overlays. Therefore, each application using the touchpad as an input device must either use the permanent inscribed template exclusively or provide a template overlay. Thus, typical systems force software application designers to either limit the possible inputs from the touchpad (by using only the permanent template) or design and define one or more custom templates for use with that particular software application.

Moreover, joysticks are typically combined only with switches and other closure type input devices. Thus, joysticks are typically not used with other input devices in a coordinated fashion.

SUMMARY OF THE INVENTION

According to the present invention, an input device is provided having a touchpad and a pair of joysticks positioned one to each side of the touchpad. The joysticks are positioned to allow two people, e.g., an adult and a child, to provide positional inputs to the computer system simultaneously and in such a manner that one person can aid the second.

The touchpad has an inscribed default template graphical design and a retainer for removably securing other template overlays to be used with the touchpad instead of the default template graphical design. The default inscribed template has a set of commands usable by many software applications. The template overlays have command sets for one or more specific software applications.

It is therefore an advantage of the present invention to provide an input device configured to allow two people to provide positional information simultaneously and to provide command access in a complete package.

It is therefore a further advantage of the present invention to provide software applications with a common set of functions accessible from a default template graphical image while at the same time giving software applications access to custom template overlays.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENT

Figure 1A:
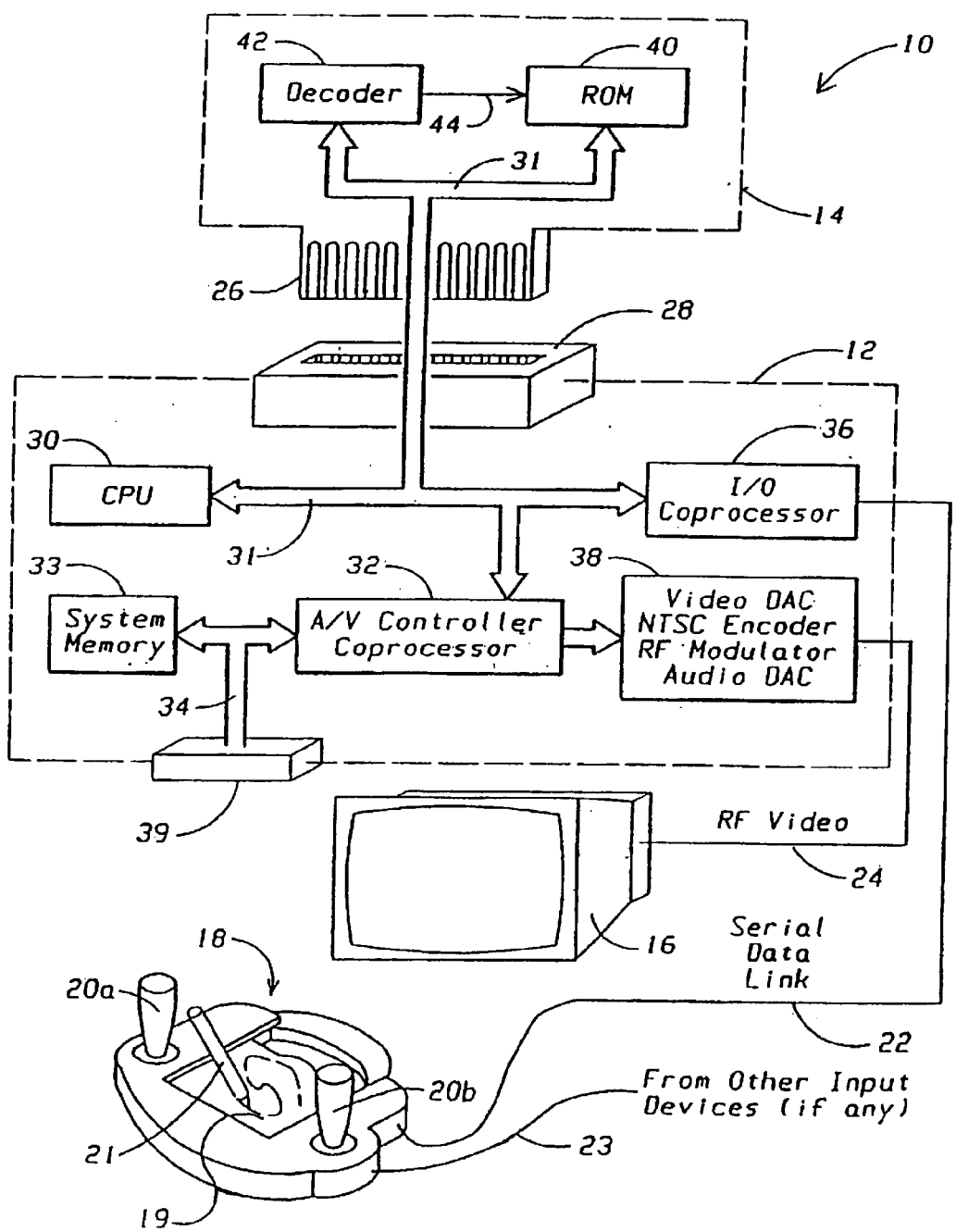
FIGS. 1A and 1B are block diagrams showing the general layout of the system of the present invention.
Figure 1B:
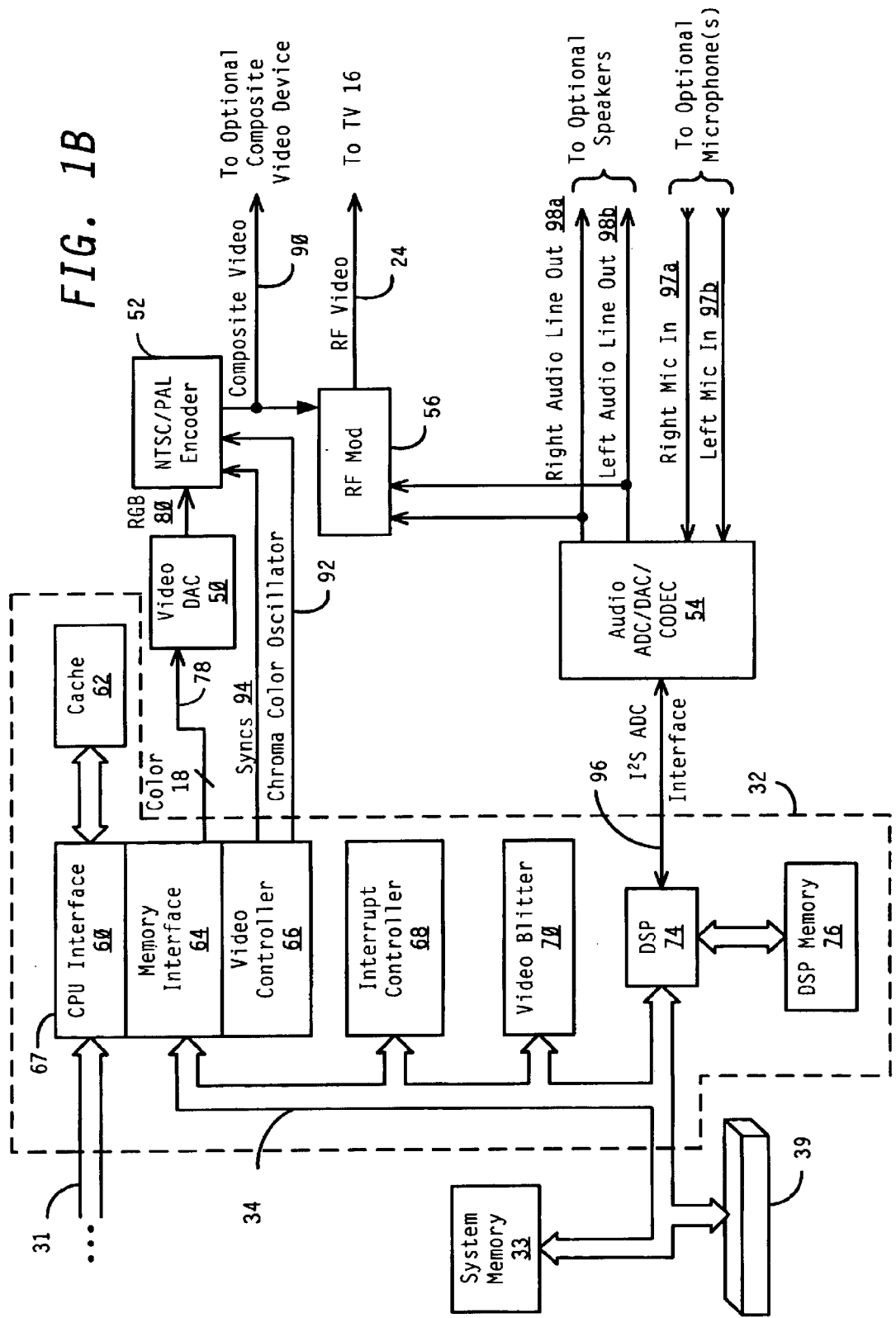

Referring to FIGS. 1A and 1B, a computer system 10 of the present invention is shown. As shown in FIG. 1A, the system 10 comprises a data processing unit 12 with a program cartridge 14 removably connected thereto. Also connected to the data processing unit 12 is a standard television set (TV) 16, and an input device 18, which has a touchpad 19 and two joysticks 20a, 20b. The input device 18 sends to the data processing unit 12 coordinate type data corresponding to the location of a touch of a finger, stylus 21, or the like on the touchpad 19. In addition, the input device 18 sends to the data processing unit 12 directional type data corresponding to movements of the joysticks 20a, 20b. Although not shown in FIG. 1A, the standard TV 16 can be replaced with a pair of speakers and a display device that accepts a composite video signal. The input device 18 connects to the data processing unit 12 via a serial data link 22. The TV 16 connects to the data processing unit 12 via an RF video line 24.

The cartridge 14 has an edge card connector, indicated generally at 26, which connects to a cartridge connector 28 thereby electrically connecting devices in the cartridge 14 to devices in the data processing unit 12.

The processing unit 12 comprises a central processing unit (CPU) 30, having a SYSTEM bus 31 associated therewith, an audio/video (A/V) controller/coprocessor 32, a system memory 33, which is connected to a SYSTEM' bus 34 generated by the A/V controller/coprocessor 32 from the SYSTEM bus 31, first and second decoder chips (not shown), an I/O coprocessor 36, two cartridge connectors (one indicated at 28, the other not shown), additional circuitry 38 required to generate the audio and video signals, and an expansion connector 39. These devices are connected in circuit communication as shown in the Figures. The additional circuitry 38 is shown in FIG. 1B and discussed in more detail in the text accompanying FIG. 1B.

The CPU 30 generates multiple buses: a DATA bus, an ADDRESS bus, and a CONTROL bus, as are well known in the art. These three buses are collectively referred to as the SYSTEM bus 31. In the preferred embodiment, the CPU 30 is an 80376, manufactured by Intel Corp., 3065 Bowers Ave., Santa Clara, Calif., 95051. The 80376 is a variation of the well known 80386SX, which is well known in the art and also available from Intel Corp. The 80376 differs from the 80386SX in that the 80376 starts up in 32-bit mode, rather than 16-bit mode. Specifically, the CR0 register is forced to a 0011H (0011 in hexadecimal notation) state with bit 0 forced to a logical ONE, effectively making the 376 operate in a 32-bit memory mode. Paging is enabled to allow virtual 386 operation.

The A/V controller/coprocessor 32 generates three spare general purpose I/O decoder lines (GPIO1, GPIO2, and GPIO3) from the SYSTEM bus 31, each providing a 32-bit I/O address range. The general purpose decoders can be used to provide three active low chip enables to devices external to the A/V controller/coprocessor 32. In the data processing unit 12, the general purpose decoders are used to decode address ranges to the I/O coprocessor 36 (GPIO1) and the two cartridge connectors (GPIO2 and GPIO3). The remaining circuitry of the A/V controller/coprocessor 32 is discussed below.

The system memory 33 comprises screen RAM, system RAM, and bootstrap ROM (all not shown). The on-board screen RAM and system RAM is 1 megabyte of 32-bit DRAM. Suitable DRAM are a pair of TCS14170BJ 256 kilobyte by 16-bit memory chips, manufactured by Toshiba, configured to provide a 32-bit memory. A portion of the address space of the CPU 30 is decoded to a number of eight-bit registers within the A/V controller/coprocessor 32. All internal locations are on even address boundaries; word-wide I/O reads and writes can be performed where appropriate. In this particular embodiment, the byte-wide writes cannot be performed on word-wide registers and I/O cycles cannot be used to access odd addresses.

The bootstrap ROM is always 16 bits wide. The bootstrap ROM comprises two 27C512 erasable programmable read-only memories, manufactured by numerous manufacturers, thereby giving 128K of bootstrap ROM. Following a reset, the one megabyte window from F20000H to FFFFFFH containing ROM and internal memory is repeated throughout the 16 megabyte address range.

The system memory 33 is shared between a number of devices. The A/V controller/coprocessor 32 is the arbitrator for the system memory 33; therefore, the SYSTEM bus 31 is modified to a SYSTEM' bus 34 (comprising a DATA' bus, an ADDRESS' bus, and a CONTROL' bus, all not shown) by the A/V controller/coprocessor 32. Thus, the system memory 33 is accessed via the SYSTEM' bus 34.

The I/O coprocessor 36 interfaces the CPU 30 to numerous input devices, such as the input device 18 and optional devices such as a keyboard (not shown), controllers (not shown), a mouse (not shown), and a printer (not shown). In the preferred embodiment, the I/O coprocessor 36 is a preprogrammed MC68HC705C8 (hereinafter "68HC705"), manufactured by Motorola Corp, running at 2 MHz. The 68HC705 I/O coprocessor 36 is interfaced to the CPU 30 by configuring the 68HC705 as a peripheral device: (1) PA0–PA7 are connected to D0–D7 of the DATA bus; (2) PB7, PB1, and PB2 are connected to GPIO1 (a 32-byte address range decoded by the A/V controller/coprocessor 32, as described below), A1, and A2, respectively, of the CONTROL bus and ADDRESS bus; and (3) PB3, PB4, and PB5 are connected to ADS, READY, and W/R, respectively, of the CONTROL bus. The I/O coprocessor 36 is decoded by the A/V controller/coprocessor to have four 16-bit addresses in I/O space (referred to herein as AS0, AS2, AS4, and AS6).

The program inside the 68HC705 interfaces to the CPU 30 as follows. The 68HC705 is designed to attach directly to the processor bus and act as an I/O port to the CPU 30. A pair of internal latches holds data passing between each of the processors until the other is ready to receive it. Status bits to each processor indicate the condition of the data latches. Each can tell if the previous data has been read and if any new data is waiting to be read by checking the status bits.

The I/O coprocessor 36 implements, inter alia, the following functions: (1) a 50 ms timer, (2) a serial controller link for receiving communication packets from the input devices, (3) a cartridge/expansion sense, for determining the presence or absence of a cartridge 14 in each cartridge connector and the presence or absence of an expansion device or CD drive in the expansion connector, (4) a system reset, and (5) an I²C nonvolatile RAM (NVRAM) interface. The I/O coprocessor 36 also implements an optional DSA compact disk control serial line to allow communications with an optional CD device. The I/O coprocessor may also perform an I/O device authorization function by matching unique I/O device authorization codes with preprogrammed I/O device authorization codes. The I/O device authorization function may be part of a system input controller (SIC) located in the I/O space and is accessible at the addresses decoded and defined by GPI01 of the CP/1 ASIC. All I/O transfers to and from the SIC are 8 bits. Alternatively, the SIC interrupts the 376/386SX processor interface to pass I/O device messages to the CPU 30 which performs matching of authorizied I/O device authorization codes. I/O device authorization codes may be any desired authorization data and sequence (and in addition to standard device-type identification data) such as, for example, the trade name and/or manufacturer's trade name, along with any other details of the device, encrypted or not, and/or an arbitrary password or code. The system may further include a text and/or graphic routine for display of validated I/O device authorization data, including product or source identifying names or anagrams or codes or passwords of I/O devices authorized for interface with the system for display on the monitor 16, when passed by the SIC of I/O coprocessor to the system 12, or when recognized by the CPU 30. The display of the I/O device authorization data to the user thus represents to the user that the connected I/O device is of the type identified, that it originated with the identified source or manufacturer of the I/O device, and that it is validly authorized by the system for interface.

Input data from I/O controllers will be sent to the system via an asynchronous serial data message which consists of the device type and number (including any authorization codes and/or passwords), and input data. The input device data messages will be received and decoded by the SIC. For example, there may be ten different input messages to the system which are generated by external input control devices. The first byte is a byte count. The second byte is a device ID (type). The device ID contains two parts. The high nibble is a device number of the I/O chain and the low nibble is the identifier for the device. Additional bytes may or may not be sent depending on the device type, and on any device authorization data required. As explained below, a checksum is the last byte, to force the sum of the entire message packet to be zero when all the bytes of the message are added using an 8 bit checksum and ingnoring any carry (modulo 256).

The 50 ms timer is implemented by configuring the watchdog timer of the 68HC705 I/O coprocessor 36 to expire at regular 50 millisecond intervals. Each time the watchdog timer expires, the I/O coprocessor 36 interrupts the CPU 30 using analog interrupt 0 (AI0) of the A/V controller/coprocessor 32 (the A/V controller/coprocessor interrupts the CPU via the IRQ line in response to the I/O coprocessor pulling AI0 low). The CPU enables and disables the 50 ms timer by writing either the byte 0F0H or the byte 00H, respectively, to the I/O port AS0. The timer defaults to being enabled.

During the interrupt acknowledge cycle of the CPU, the A/V controller/coprocessor asserts the address of the interrupt handling routine. The interrupt handling routine causes the CPU 30 to read one or more bytes from the 16-bit I/O port AS0, which corresponds to the I/O coprocessor. During each read of I/O port AS0, the A/V controller/coprocessor 32 to selects the I/O coprocessor 36, thereby allowing a data transfer between the CPU 30 and the I/O coprocessor 36.

The I/O coprocessor 36 will always have one byte to be transferred to the CPU in response to the 50 ms interrupt. The lower nibble of this byte contains the number of expirations of the 50 ms time since the last interrupt acknowledge cycle and the upper nibble of this byte contains the number of I/O device messages to be transferred to the CPU. If the 50 ms timer is disabled, then the lower nibble of this byte will be zero. If more than 15 messages have been received, then 15 is sent in the upper nibble and any remaining messages are sent during the next transfer. Depending on the contents of this first byte, the CPU might read subsequent bytes from the I/O coprocessor 36, which will, for the most part, be packets of data from input devices. Typically, the input devices will only send messages when their respective states change, thereby keeping message transmission frequency very low.

The input device 18 and all other input devices are connected to the I/O coprocessor 36 via the serial data link 22. The individual input devices (e.g., the input device 18) transform the movements of the control devices into a format suitable for transmission along the serial link 22. The input device 18 sends data packets via the serial data link 22 to the system unit 12. As will be explained below, the structure of the data packets differ depending on the type of input device. Coordinate type devices (mouse, analog joystick, touchpad, etc.) have a different data packet structure than a switch closure type of device (keyboard, digital joystick, switch pad, etc.).

The serial controller link 22 consists of three (3) lines: a data receive line, a VCC (+5 VDC) line, and a ground line. The 68HC705 implements the data receive line of the controller serial link using the PD0/RDI pin of the 68HC705. This pin is designed to be used as an interface to serial devices using the well known asynchronous format. Serial transmissions have the following format: 4800 bits per second, no parity, 8 data bits, and one stop bit. A clocked synchronous format could be used in the alternative. The serial controller link 22 is connected to external devices by a six-conductor mini-din plug connector (not shown), which are well known in the art. Input devices are daisy chained, thus a single device physically connects to the data processing unit 12. For example, if a so-called mouse pointing device is added to the system 10, the mouse is connected to the input device 18, which is connected to the processing unit 12.

The cartridge sense and expansion sense are for determining the presence or absence of a cartridge 14 in each cartridge connector or the expansion connector and is implemented by having the I/O coprocessor 36 poll a pin of the cartridge connector 28. The pin is pulled to a logical ONE by a suitable pullup resistor (not shown) on the system planar and a properly connected cartridge 14 pulls the pin to a logical ZERO. Thus, a ONE at each cartridge sense indicates the absence of a cartridge 14 and a ZERO indicates the presence of a cartridge 14. Likewise, a ONE the expansion sense indicates the absence of an expansion device, such as an optional CD drive, and a ZERO indicates the presence of an expansion device.

The reset is implemented by giving the I/O coprocessor 36 control over the reset signal of the A/V controller/coprocessor 32, which in turn controls the reset signal of the CPU 30. The CPU 30 can command the I/O coprocessor 36 to reset the system 10 by causing the I/O coprocessor 36 to reset the A/V controller/coprocessor, which in turn resets the CPU 30. The CPU causes the I/O controller to generate a system reset by writing the byte 0FFH to I/O port AS0. In addition, the I/O coprocessor 36 monitors the optional reset switch (not shown) for the system and resets the system when it detects a switch closure.

Finally, the I/O coprocessor implements an I$^2$C nonvolatile RAM (NVRAM) interface to read, write, and verify the contents of 512 bytes of nonvolatile system RAM. The NVRAM (not shown) comprises a PCF8594 manufactured by Philips Semiconductor and is in circuit communication with the I/O coprocessor via the I$^2$C interface. More than one PCF8594 can be cascaded to provide more NVRAM capability. To access the NVRAM, a three-byte sequence is used. All three bytes are accessed through I/O port AS0. The first byte written to the I/O coprocessor by the CPU indicates whether the transfer is a read or a write and gives the I/O coprocessor a segment address. The lower nibble of this byte indicates the type of transfer: 01H indicates a write from NVRAM and 02H indicates a read from NVRAM. The upper nibble of this byte is a 4-bit segment number corresponding to a 256-byte segment of NVRAM. With 512 bytes of NVRAM, only the bottom two segments (0 and 1) are used. For both reads and writes, the next byte is the same—the next byte is written by the CPU and is the address of the byte being accessed within the segment. The last byte is either written to or read from the I/O coprocessor by the CPU and is the data byte read from or to be written to the NVRAM.

In the alternative, the I/O coprocessor can be implemented in other ways. For example, a tristated readable shift register might suitably receive the information from the serial data link 22. In that case, the CPU 30 periodically reads the shift register to access the data packets from input devices.

The first decode chip (not shown) is in electrical circuit communication with the CPU 30, the A/V controller/coprocessor 32, and the two cartridge connectors 28 (the other not shown). The first decode chip accepts as inputs the upper two address lines of the SYSTEM bus 31, decodes the 16 megabyte address space of the 80376 CPU 30 into four 4 megabyte regions, represented by three chip select lines: two for the cartridge connectors 28 (the other not shown) and one for the A/V controller/coprocessor 32. The upper four megabytes and the lower four megabytes are decoded to the A/V controller/coprocessor chip select and the two remaining four-megabyte regions are decoded to two cartridge connector chip selects.

The second decoder chip (not shown) is used to implement the chip select for the expansion connector 39. The second decode chip is in circuit communication with the A/V controller/coprocessor 32 and the expansion connector 39 along the SYSTEM' bus 34. The second decode chip permits the A/V controller/coprocessor 32 to decode a 128K block of system ROM starting at F20000H. The range from F40000H to FFFFFFH is decoded by the second decode chip for use by the expansion connector 39. This block of ROM decoded by the second decode chip is used to add ROM to the system 10 via the expansion connector 39.

The data processing unit 12 also has a pair of cartridge connectors (one indicated at 28, the other not shown) for placing a cartridge 14 in circuit communication with the CPU 30 and other system components. The cartridge 14 connects to the connector 28 of the data processing unit 12 via a gold plated 62-pin (two rows of 31 conductors) edge card connector 26. The processor unit 12 has two cartridge connectors 28 for accepting the edge card connections of the edge card connector 26. The cartridges 14 have gold plated card edge connections to match the conductors of the connectors 28, allowing the cartridges 14 to be pluggably connected to the processor unit 12. The following signals are communicated to external devices via the cartridge connectors 28 (the other not shown): SYSTEM bus 31 signals, a cartridge sense line, power, ground, analog interrupt 1 or 2 (each cartridge has a unique interrupt), GPIO 2 or 3 (each cartridge has a unique chip select), a lock line (which is a typical signal of the 80376 and 80386SX SYSTEM bus 31), and a cartridge select, which is generated by the first decode chip. In the alternative, the signals needed to connect to an optional CD drive can also be connected to external devices via the cartridge connector 28.

In addition, the processor unit 12 has a single 112-pin (two rows of 56 pins each) edge card expansion connector 39. The expansion connector 39 allows devices to add more memory to the system memory 33 and to add various other features. Devices connected to the expansion connector 39 have gold plated card edges to match the expansion connector, allowing the devices to be pluggably connected to the processor unit 12. The following signals are communicated to external devices via the expansion connector 39: SYSTEM' bus signals, an expansion connector 39 sense line, power, ground, CAS and RAS lines, and an expansion connector 39 select, which is generated by the second decode chip. In the alternative, the signals needed to connect to an optional CD drive can also be connected to external devices via the expansion connector 39.

The program cartridge 14 comprises a program ROM 40 and a decoder 42. In the alternative, the decoder 42 can be designed into the processing unit 12. The program ROM 40 contains code suitable for execution on the CPU 30 in a read only memory format. In the alternative, other memory types, such as battery-backed RAM can be used as the storage device in the cartridge 14. The program ROM 40 is in circuit communication with the CPU 30, as shown in FIG. 1A.

The address decoder 42 within the cartridge 14 decodes the full width of the ADDRESS bus to a memory range appropriate for the program ROM 40 and generates a chip select signal 44 required by the ROM 40, as is well known in the art. The address decoder 42 is implemented in a 16V8 programmable array logic (PAL), which is well known in the art and is manufactured by numerous manufacturers, e.g., AMD Corp. If the decoder 42 is designed into the processing unit 12, then the select 44 is electrically communicated to the ROM 40 by the connector 26.

Referring now to FIG. 1B, the additional circuitry 38 of FIG. 1A is shown connected to the A/V controller/ coprocessor 32. The additional circuitry 38 comprises four devices: a video digital-to-analog converter (video DAC) 50, an NTSC/PAL ("PAL" referring to the well known European television signal standard) encoder 52, an audio digital-to-analog converter/analog-to-digital converter/compressor/decompressor (ADC/DAC/CODEC) 54, and an RF modulator 56. Each is connected as shown in the Figures.

The Audio/Video controller/coprocessor (A/V controller/coprocessor) 32 electronics are largely contained within one massive custom logic chip, known as an ASIC (Application Specific Integrated Circuit). An A/V controller/coprocessor 32 meeting the description herein can be purchased from MSU Ltd., 270 Upper 4th Street, Witan Gate West, Central Milton Keynes, MK9 1DP England. The A/V controller/coprocessor 32 contains a processor interface 60, a processor cache 62, a memory interface/refresh 64, a video controller 66, an interrupt controller 68, a video blitter 70, an optional CD block decoder, a digital signal processor (DSP) 74, and a DSP memory 76. The processor interface 60, the memory interface/refresh 64, and the video controller 66 are referred to collectively as the video/memory controller 67. The system memory 33, central processing unit 30, and other devices lie outside the A/V controller/coprocessor 32.

The A/V controller/coprocessor 32 generates the SYSTEM' bus 34 from the SYSTEM bus 31, thereby isolating the CPU 30 from the system memory 33. Thus, the SYSTEM' bus 34 electrically connects the various devices to the system memory 33. Sharing the SYSTEM' bus 34 are six possible bus masters (in order from highest priority to lowest priority, respectively): the memory refresh 64, the video controller 66, an optional CD block decoder (not shown), the DSP 74, the blitter 70, and the CPU 30 (through the processor interface 60). Only one of the bus masters can control the SYSTEM' bus 34 at any one time. The arbitrator within the video/memory controller 67 controls the changing priorities of the devices, as described herein, and is in electrical circuit communication with all the devices within the A/V controller/coprocessor 32. For example, the CPU 30 has the lowest priority of all bus masters until an interrupt occurs. Thus, the arbitrator is in circuit communication with both the CPU interface 60 and the interrupt controller 68.

The cache 62 is not a cache in the sense that it prefetches instructions for the CPU 30. Rather, the cache 62 is a 512×16-bit static RAM located at F14000H to F143FFH that can be used by the CPU 30 for variables, stack, or program code to speed up program execution.

The video/memory controller 67 (the processor interface 60, the memory interface/refresh 64, and video controller 66) controls the SYSTEM' bus 34, and provides the memory timing signals (e.g., CAS, RAS, write enable, etc.) for memory devices attached to the SYSTEM' bus 34, as is well known in the art. It suspends bus master operations during video lines for brief periods to fetch any video display data, and to refresh dynamic RAM (DRAM). It also controls the interface with the CPU 30.

The video controller 66 has a flexible video timing generator that can be programmed to suit different TV standards and monitors up to a 640 by 480 VGA standard. The exact video format is controlled by setting various registers in the A/V controller/coprocessor: horizontal period, horizontal sync, horizontal blanking end, horizontal blanking begin, horizontal display begin, horizontal display end, horizontal fetch begin, horizontal fetch end, horizontal vertical sync, vertical period, vertical sync, vertical blanking end, vertical blanking begin, vertical display begin, vertical display end, video interrupt, and light pen registers. The video controller 66 has three color resolutions available: four bits per pixel, eight bits per pixel, and 16 bits per pixel. The memory map of the screen is not tied to the video display width, but is defined independently.

The video/memory controller 67 decodes the 16 megabyte address range of the 80376 CPU 30 into the following memory map: 1 MB of system RAM (000000H–0FFFFFH), 4 MB for the first cartridge ROM (400000–7FFFFFH), 4 MB for the second cartridge ROM (800000–BFFFFFH), 64 KB of internal memory for the audio/video controller/coprocessor (F10000H–F1FFFFH), and a 128 KB block of system ROM (FE0000H–FFFFFFH). The 64 kilobytes of internal memory comprises palette RAM, blitter registers, and DSP registers and memory. The palette address range was stated above. The blitter registers extend from the range F10400H to F107FFH. The DSP memory extends from F10800H to F18000H.

If the optional CD drive is added to the system, the following regions are added to the memory map: another 1 MB of system RAM (100000H–1FFFFFH) and 128 KB for the CD drive (FC0000H–FDFFFFH).

The interrupt controller 68 interfaces six internal interrupts to the CPU 30: video interrupt (highest priority), analog interrupt 0 (AI0), analog interrupt 1 (AI1), analog interrupt 2 (AI2), CD block decoder interrupt, and DSP interrupt (lowest priority). The interrupt controller automatically clears an interrupt when the CPU 30 performs the interrupt acknowledge cycle. A mask bit is available for each of the interrupts.

The blitter 70 is a graphics processor for fast screen updates and animation, acting as a hardware graphics subroutine for the CPU 30 or DSP 74. It executes commands written by the CPU 30 and the DSP 74 into memory. It can perform arbitrarily long sequences of graphics operations by reading new command sets from system memory 33. It becomes bus master through blitter program operation, and can therefore have exclusive control of the SYSTEM' bus 34 for considerable periods. However, its priority over the CPU 30 is not absolute; it can be requested to give up the SYSTEM' bus 34 to the CPU 30 when an interrupt occurs. The CPU 30 is the lowest priority bus master at the system level; however, it has complete control of the other hardware, therefore, the use of the SYSTEM' bus 34 is entirely under CPU 30 program control.

The blitter 70 has a versatile comparator to allow intelligent blitting operations, and a logic function unit (LFU) to generate the output data. The logic function unit can combine the contents of the data registers in a number of useful ways to produce the output data and the comparator can perform certain comparisons on the data to inhibit write operations, and optionally stop blitter operation.

The logic function unit generates the output data, which is written to the destination in system memory 33. It can perform any logical combination of the source and destination register pixels. "Source data pixels" can be selected from either of the source data register or the data pattern data register. The LFU selects any of the four Boolean minterms ($A \& B$, $\overline{A} \& B$, $A \& \overline{B}$, and $\overline{A} \& \overline{B}$) of the two sets of input data from the data registers, and generates the logical OR of the two selected minterms. This allows any logical combination of input data; thus 16 functional possibilities exist.

The comparator can perform a variety of comparisons on the data in the source, destination, and pattern data registers. If its comparison conditions are met, then it generates an inhibit signal. The inhibit signal is used to inhibit a write operation, and optionally, to stop the blitting operation. The comparator can also be used to provide a pixel plane effect, to give transparent colors, for collision detection and system memory 33 search operations, and as an aid to character painting.

The DSP 74 is a simple, very high-speed processor for sound synthesis, operating at up to 33 million instructions per second (MIPs). It has access to the SYSTEM' bus 34 via a DSP DMA controller (not shown), which allows it to read and write bytes or words into system memory 33. These transfers occur in short bursts, and are under DSP program control. The DSP 74 actually executes programs and stores data in its own private high-speed memory 76.

The DSP 74 audio coprocessor is a general purpose arithmetic coprocessor with sufficient power to implement a high performance music synthesizer. Synchronous serial outputs are provided for a generation of stereo audio signals with 16 bit precision, giving a sound quality normally associated with compact disc technology. The DSP 74 is micro-programmable from the host CPU 30 and the instruction set is sufficiently flexible to enable the user to program the device to fulfill many different functions that are quite different from that of "music synthesizer." Such applications might include algorithmic speech generation, audio analysis using fast Fourier transform techniques, and three-dimensional graphics rotations. The DSP 74 uses Harvard architecture (separate program and data buses) for maximum data throughput. The DSP 74 has an arithmetic logic unit (ALU), which features a hardware 16-bit by 16-bit hardware multiply/accumulate as well as addition, subtraction, and logical functions. There is also a separate serial divide unit, which generates one quotient bit per tick.

The ALU within the DSP 74 is a 16-bit arithmetic logic unit, with the same functions as a Texas Instruments 74181, which is well known in the art. Common arithmetic operations are encoded as instructions; uncommon instructions can be performed by directly setting up the ALU mode bits with the general purpose arithmetic instruction (GAI).

The DSP 74 has a DSP memory 76 associated with it. The DSP memory 76 comprises program RAM, data RAM, a register/constant table, and a sine ROM (all not shown). The DSP memory 76 in general is accessible in both the DSP's internal address space as well as the address space of the system memory 33. The DSP program RAM is 512 18-bit words. These locations can only be written by the CPU 30, and are program read-only as far as the DSP 74 is concerned. Program RAM does not appear in the DSP internal address space. The program RAM is not accessible to the host when the DSP 74 is running, but is accessible when the DSP is idle.

The DSP 74 also has a serial audio digital-to-analog convertor (DAC) interface. The serial DAC interface allows the DSP 74 to both drive a synchronous serial ($I^2S$ or similar) DAC, and to input data from a synchronous serial data source such as a CD drive.

Figure 1C:
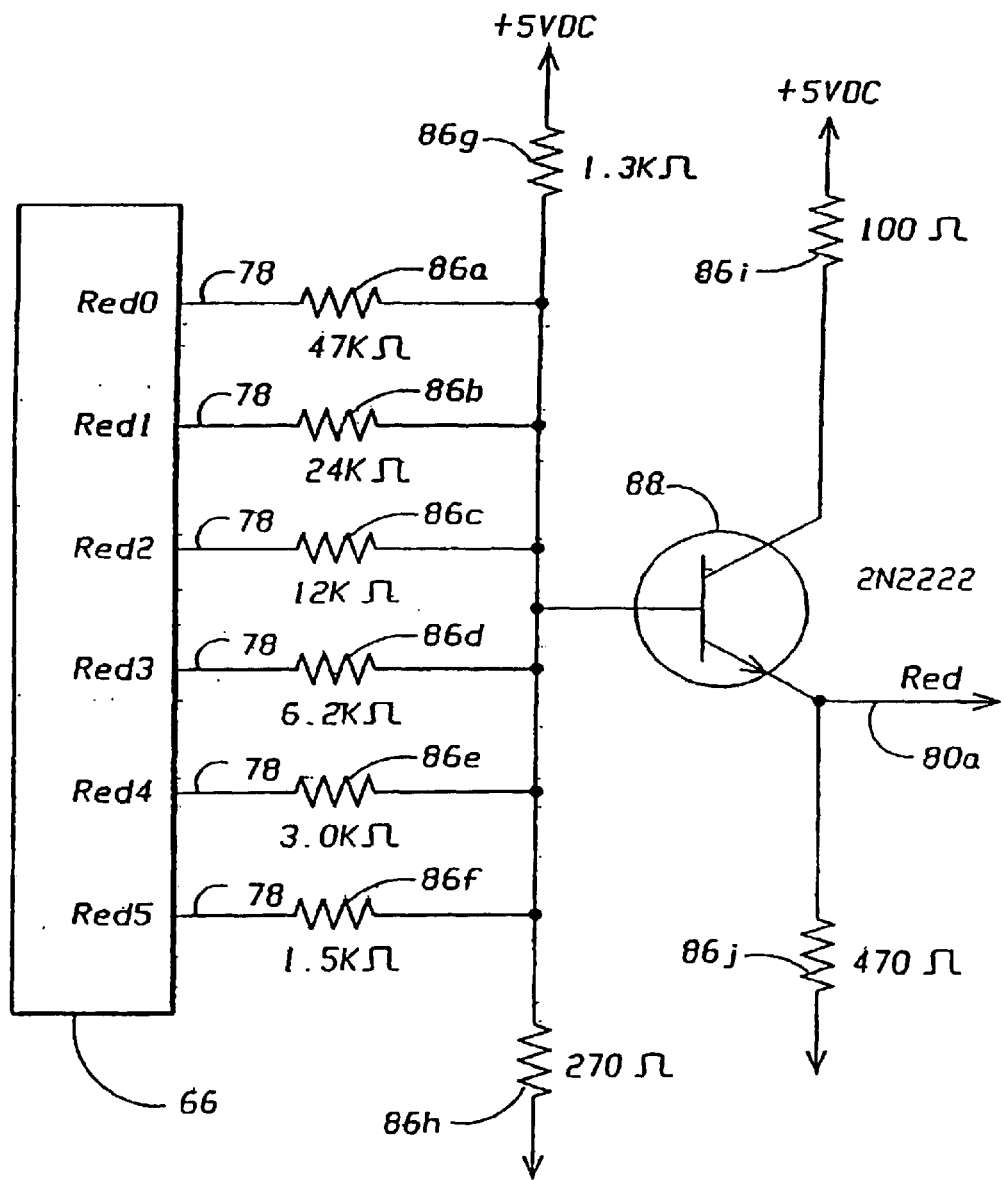
FIG. 1C is a schematic diagram showing the details of the video digital to analog converter used in the system of the present invention.

The video controller GG of the A/V controller/coprocessor 32 connects to the external video DAC 50, which converts the eighteen bits of pixel information 78 (six bits each of red, green, and blue) from the video controller 66 into an RGB signal 80, as is well known in the art. Each color channel (R 80a, G 80b, and B 80c) of the video DAC 50 is implemented with an R2R resistor tree and a 2N2222 transistor, as shown in FIG. 1C. The devices in FIG. 1C are in circuit communication, as shown. The resistors 86a–86j in FIG. 1C are all 0.25 watt resistors with the values shown, within 5% tolerance. The transistor 88 is a 2N2222.

Referring once again to FIG. 1B, the RGB signal 80 is converted to an NTSC composite video signal 90 by the NTSC/PAL encoder 52. The NTSC/PAL encoder 52 accepts the chroma clock 92, the HSYNC and VSYNC signals 94, which are generated by the video controller 66 of the A/V controller/coprocessor 32, and the red 80a, green 80b, and blue 80c video outputs, which are generated by the video DAC 50, and generates a composite video signal 90 in the well known NTSC or baseband video format. In the alternative, the well known PAL (European television signal standard) format can be generated. The composite video signal 90 is connected to external devices with a single female RCA type phono jack (not shown), as is well known in the art. In the preferred embodiment, the NTSC/PAL encoder 52 is a CXA1145, manufactured by Sony Corp. In the alternative, an MC1377, manufactured by Motorola Corp. can be used.

The audio ADC/DAC/CODEC 54 is linked to the DSP 74 with a serial link 96 conforming to the well known Philips $I^2S$ protocol. The ADC/DAC/CODEC 54 converts analog data to digital data, and vice versa, and compresses and decompresses digital data. The ADC/DAC/CODEC 54 interfaces external stereo analog data 97a–97b from optional microphones to the A/V controller/coprocessor 32. The audio inputs 97a–97b are connected to external devices with a standard stereo ¼" connector. The audio ADC/DAC/CODEC 54 also interfaces digital data from the A/V controller/coprocessor to external devices by generating left and right audio line out signals 98a–98b. These signals 98a–98b are connected to external devices, such as optional speakers (not shown) with two female RCA phone jacks, as are well known in the art. As mentioned below, the audio line signals 98a–98b are also added to the RF video signal 22.

In the preferred embodiment, the ADC/DAC/CODEC 54 is a CS4216, manufactured by Crystal Semiconductor. The part contains microphone inputs, with programmable gain, as well as outputs with programmable attenuators. Gain and attenuation are both programmably controlled by the DSP 74.

In the alternative, the ADC/DAC/CODEC 54 can be replaced with a TDA1311 DAC manufactured by Philips. If this chip is used, the ADC and CODEC functions will not be available.

The RF modulator 56 merges the composite video signal 90 from the NTSC/PAL encoder 52 with the left and right audio line out signals 98a and 98b from the audio ADC/DAC/CODEC 54 onto a carrier frequency to generate an RF video signal 22 that is suitable for being directly inputted into the TV 16. To generate the different PAL (European television signal standard) and NTSC formats a different RF modulator and crystal must be used. The RF video signal 22 is connected to external devices with a single female Type F coaxial connector, as is well known in the art.

Referring now to FIGS. 2A–2M and 3, an embodiment of the input device 18 of the present invention is shown. As shown in that figure, the input device 18 comprises a touchpad 19 and two joysticks 20a, 20b enclosed in a single enclosure 100. The enclosure 100 is made of ABS-T (acrylonitrile-butadiene-styrene; available from Wong's Electronics Co. LTD., Wongs Industrial Centre, 180 Wai Yip Street, Kwun Tong, Kowloon, Hong Kong, as material ABS, grade T). The input device 18 accepts template overlays 102, each of which overlay comprises a body 104, a tab 106, and an identification pattern 108 at one edge on the bottom. The template overlay 102 is made of a thin material such as coated paper, coated cardboard, or polyester film. One suitable polyester film is manufactured by Du Pont and widely available under Du Pont's "Mylar" trademark. The body 104 has a graphical image inscribed therein or thereon; that is, the graphic design is written, printed, painted, carved, engraved, silkscreened, or otherwise permanently affixed in or on the overlay body 104. The tab 106 extends from the body 104 and is used to grip the template overlay 102. The identification pattern 108 will be described in the text accompanying FIGS. 2G–2K.

The touchpad 19 has a pad surface 110, which is exposed to allow contact by a finger, stylus 21, or the like. The pad surface has a default template graphical design inscribed in or on the pad surface 110; that is, the default template graphic image is permanently written, printed, painted, carved, engraved, silkscreened, or otherwise affixed on or in the pad surface 110.

Figure 2A:
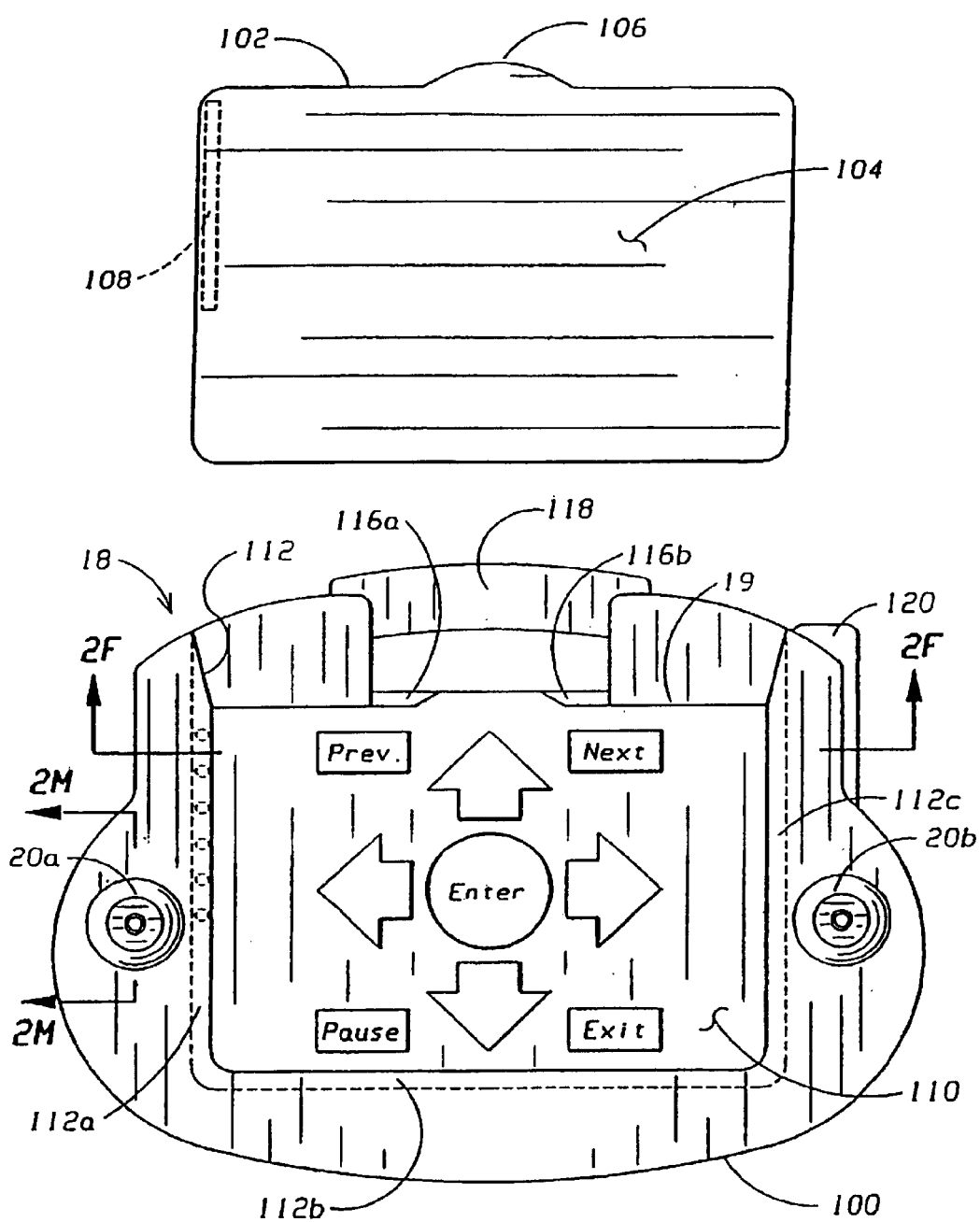
FIG. 2A is a top plan view of the input device of the present invention showing the touchpad with default template, the two joysticks, and a template overlay.

As shown in FIG. 2A, the following functions can be supported by the default template graphic design inscribed in or on the pad surface 110: "enter," "exit," "pause," "previous," "next," and arrow keys (up, down, left, and right). In the alternative, "select" can be used instead of "enter" and "cancel" can be used instead of "exit." Again in the alternative, ten rectangular areas can be mapped out—one for each Arabic numeral. Again in the alternative, the letters of the English language can each be mapped to a region of the touchpad. Again in the alternative, a QWERTY keyboard could be mapped onto the pad surface 110. Indeed, virtually any pattern, or combination of patterns and symbols, can be chosen. The default template graphic image should be chosen to be useful to a large number of applications targeted for the system 10.

The input device 18 comprises two forms of retainers to secure a template overlay 102 proximate to the pad surface 110: (1) an overhanging lip 112, which comprises three straight lip portions 112a–c that define a generally U-shaped slot 114 and that retain the template overlay 102 on three sides and (2) a pair of ridges 116a, 116b that retain the template overlay 102 on the fourth side. The lip 112, slot 114, and ridges 116a, 116b are shown in more detail in and described in the text accompanying FIGS. 2C, 2D, and 2E.

Also shown in FIG. 2A are a handle 118 for carrying the input device 18 and a tubular aperture 120 for storing the stylus 21.

Figure 2B:
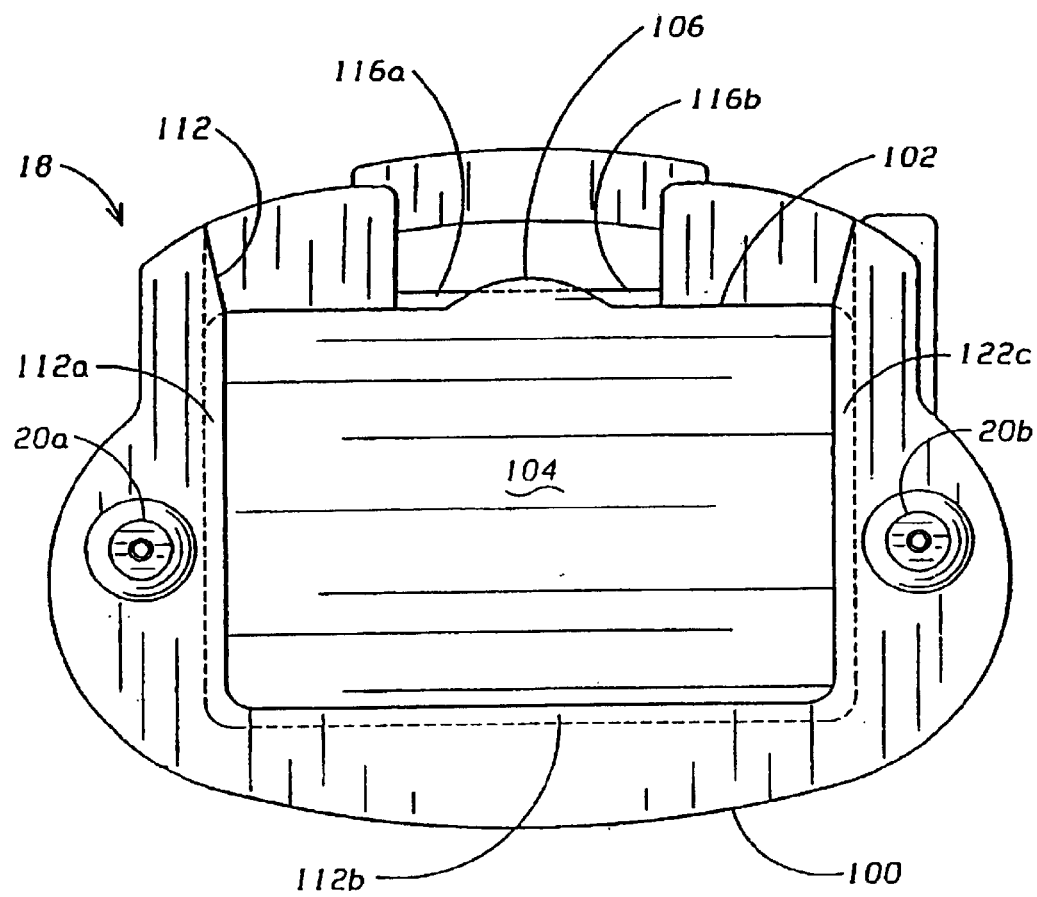
FIG. 2B is a top plan view of the input device of the present invention with a template overlay inserted into the template overlay retainer.

Referring now to FIG. 2B a top plan view of the input device 18 with a template overlay 102 in place proximate to the pad surface 110 is shown. As shown in that figure, three sides of the body 104 of the overlay 102 are slipped under the three lip portions 112a–112c. Also shown in that figure are the ridges 116a, 116b retaining the fourth side of the body 104 of the overlay 102, one positioned on either side of the tab 106 of the overlay 104. The overlay 102 is inserted by slipping the left hand and right hand sides of the body 104 of the overlay 102 under the lip portions 112a and 112c and sliding the overlay 102 down until the bottom edge of the body 104 of the overlay 102 is under the other lip portion 112b. Finally the overlay 102 is released and the tab 106 is nested between the ridges 116a, 116b, which retain the overlay 102 at the top side.

Figure 2C:
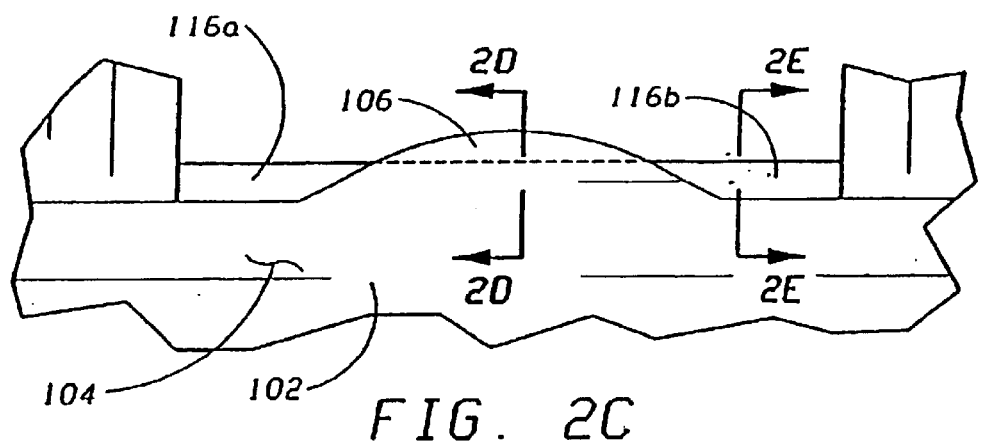
FIG. 2C is an enlarged fragmentary plan view of a portion of the input device of the present invention shown in FIG. 2B.
Figure 2D:
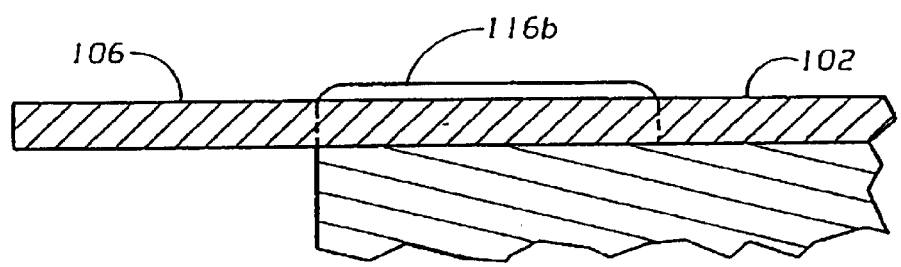
FIG. 2D is a sectional view taken substantially along the plane designated by the line 2D—2D of FIG. 2C.
Figure 2E:
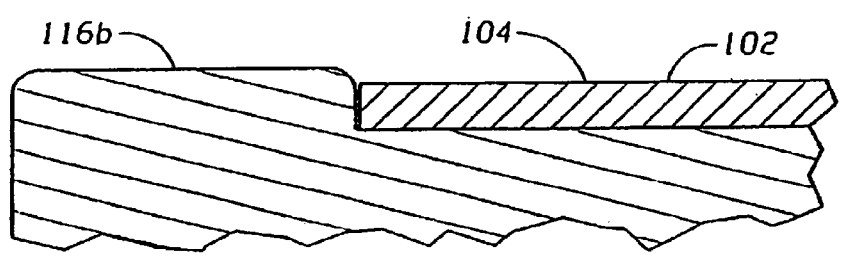
FIG. 2E is a sectional view taken substantially along the plane designated by the line 2E—2E of FIG. 2C.

FIGS. 2C, 2D, and 2E show the details of the ridges 116a, 116b and the overlay 102. FIG. 2D shows the tab 106 extending beyond the ridge 116b. FIG. 2E shows the body 104 of the overlay 102 abutting the ridge 116b.

The overlay 102 is removed by gripping the tab 106 with thumb and forefinger and raising the body 104 of the overlay 102 above the ridges 116a, 116b, thereby allowing the overlay 102 to slide out from under the U-shaped lip 112 and over the ridges 116a, 116b.

Figure 2F:
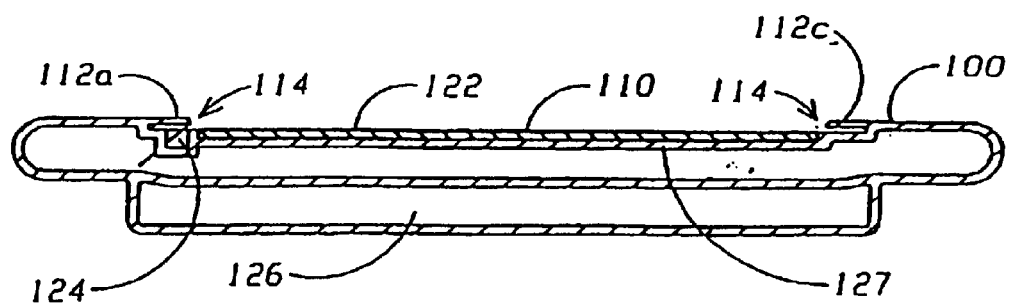
FIG. 2F is a sectional view taken substantially along the plane designated by the line 2F—2F of FIG. 2A.

FIG. 2F shows the slot 114 that retains the overlay 102 on three sides. Also shown in that figure are the touchpad sensor 122, an overlay sensor 124, a cavity 126 for storing a plurality of template overlays 102, and a substantially rigid base 127 made of the same material as the enclosure 100 that provides a resistive force sufficient to allow a touch of the sensor 122 to be detected.

The touchpad sensor 122 is located proximate to said pad surface 110 and is configured in such a manner that pressure on or near the pad surface 110 by the finger, stylus 21, or the like allows the sensor 122 to detect the location of the touch.

The touchpad sensor 102 can be any one of many types, such as impedance-based sensors, acoustic sensors, and switch closure type sensors. Examples include membrar switch matrixes, e.g., the device disclosed in U.S. Pat. No. 4,736,190 to Florella, and finer resolution switch closure type sensors, e.g., the device disclosed in U.S. Pat. No. 4,529,959 to Ito et al. One suitable sensor 102 can be purchased from Wong's Electronics Co. LTD., Wongs Industrial Centre, 180 Wai Yip Street, Kwun Tong, Kowloon, Hong Kong, as part number PR39983.

The sensor 122 generates at least one electrical signal responsive to the stylus 21, finger, or the like touching the pad surface 110 or touching the template overlay 102 proximate to the pad surface 110. For example, switch closure type sensors typically require a number of drivers to sequentially drive the many lines on one axis and a number of receivers to detect which of the lines on the other axis is conducting the signal driven by the drivers. Knowing which driver generated the signal detected by which receiver allows one to determine the location of the touch causing the switch closure.

The overlay sensor 124 is a sensor that generates an electrical signal corresponding to the identification pattern 108 on the overlay 102. Thus the overlay sensor 124 of the touchpad 19 and the identification pattern 108 of the template overlay 102 must correspond both in location and in device technology. A suitable overlay sensor 124 is a bank of six optoelectrical transmitter/receivers each having an angled transmitter and an angled receiver, which are well known in the art and are available from Wong's Electronics Co. LTD, as part number PR39990.

Figure 2G:
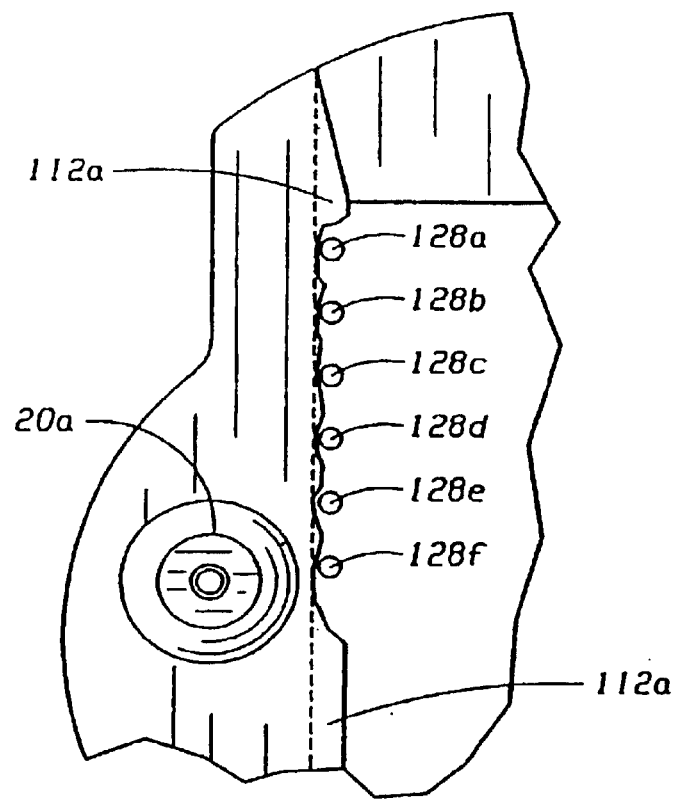
FIG. 2G is a fragmentary top plan view of the view of the input device of the present invention shown in FIG. 2A with parts broken away for clarity.
Figure 2K:
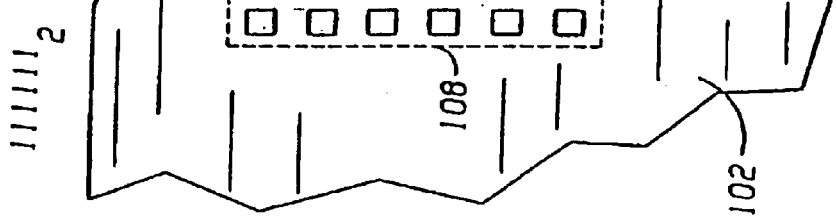
FIGS. 2H–2K are bottom plan views of different embodiments of an edge of a template overlay showing the identification patterns.
Figure 2J:
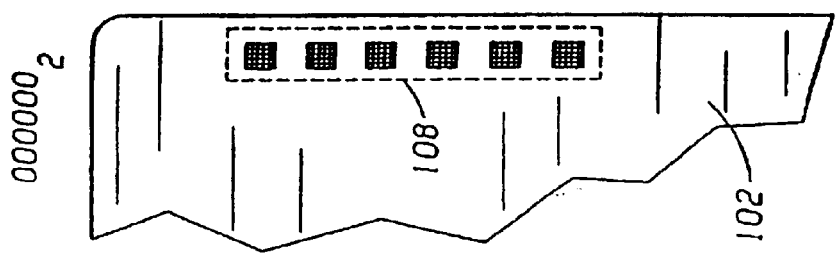
Figure 2I:
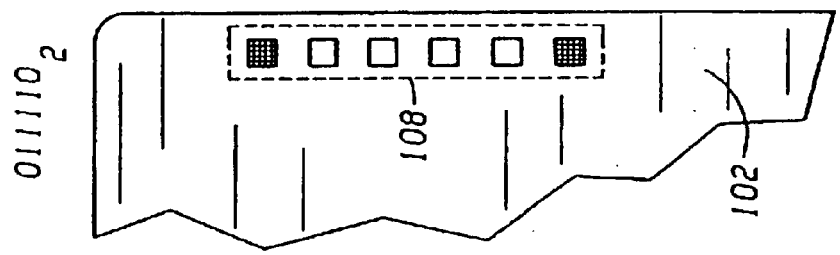
Figure 2H:
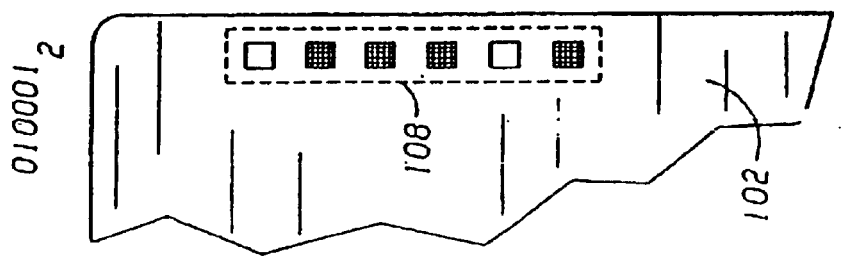

As shown in FIG. 2G the overlay sensor 124 is optically coupled to the identification pattern 108 via six holes 128a–128f in the enclosure 100. Under each hole 128 is a single optoelectronic transmitter/receiver pair (not shown). In another embodiment (not shown), the six receiver/transmitter pairs of the overlay sensor 124 and the six holes 128a–128f can be divided into two groups of three and positioned one on either side of the touchpad sensor 122. That is, three holes 128a–128c (and their associated receiver/transmitter pair) can be positioned under one lip portion 112a and the other three holes 128d–128f (and their associated receiver/transmitter pairs) can be positioned under another lip portion 112c.

FIGS. 2H–2K show examples of identification patterns 108. The identification patterns 108 are located on one edge of the template overlay 102. There are six individual marks—one for each individual transmitter/receiver pair of the overlay sensor 124. When the overlay 102 is in place, the identification pattern 108 aligns with the sensor 124. If the alternative embodiment, described above, in which two groups of three holes is used for the sensors, then the identification patterns 108 must likewise be divided into two groups of three and positioned one on either side of the touchpad sensor 122.

Using optoelectrical transmitter/receiver pairs as the sensor 124 allows very simple identification patterns 108 to be designed into the template overlay 102. If the material from which the overlay is made is white, then regions of black ink or paint applied to the back of the overlay can be used as one form of identification pattern and white areas without black ink can be used as the other.

Examples of several different possible combinations of identification patterns are shown in FIGS. 2H–2K. FIGS. 2H through 2K show identification patterns 108 corresponding to binary patterns of $010001_2$, $011110_2$, $000000_2$, and $11111_2$, respectively. Thus, the identification patterns appear to be a group of light and dark regions spaced along the edge of the template overlay 102. The $000000_2$ pattern is shown for illustrative purposes only. In actual use, the all white $000000_2$ pattern will probably not be used, because that pattern corresponds to the absence of any template overlay 102, in which case the default template graphic image would be used.

Figure 2L:
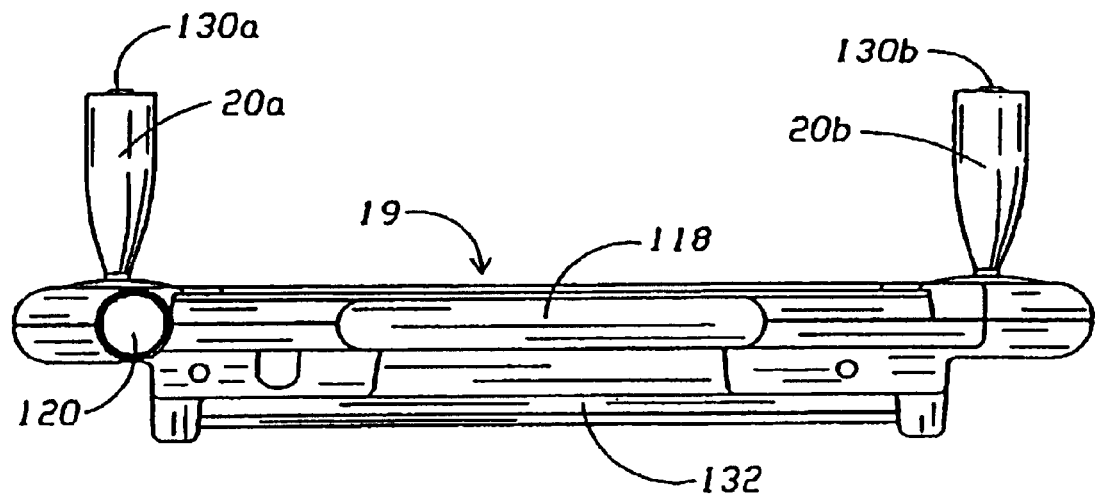
FIG. 2L is a front elevational view of the input device of the present invention.

FIG. 2L, which is a front elevational view of the input device 18 of the present invention, shows the positioning of the joysticks 20a, 20b one on each side of the touchpad 19. As shown in that figure, the joysticks 20a, 20b each have momentary pushbutton switches 130a, 130b affixed in their respective ends. FIG. 2L also shows the rectangular aperture 132 that opens to the cavity 126, which is used to store a plurality of template overlays.

Figure 2M:
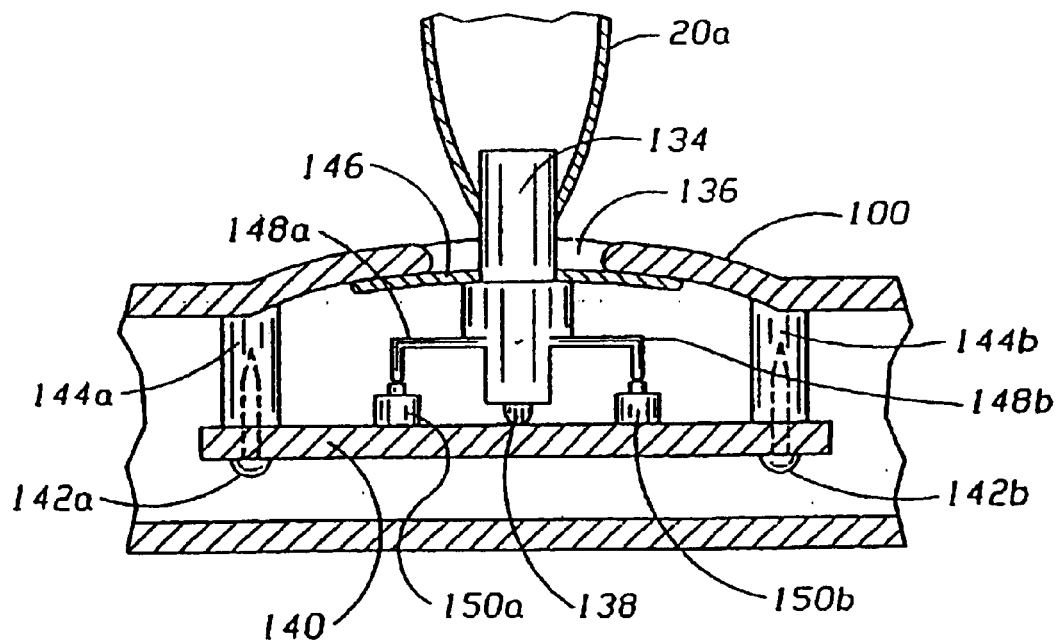
FIG. 2M is a partial sectional view taken substantially along the plane designated by the line 2M—2M of FIG. 2A showing the details of the joysticks used in the input device of the present invention.

FIG. 2M, which is a partial sectional view taken substantially along the plane designated by the line 2M—2M of FIG. 2A, shows the details of the joysticks used in the input device of the present invention. The details of FIG. 2M are repeated for both joysticks 20a and 20b. Moreover, the details of FIG. 2M are 90-degrees rotationally symmetrical; thus, while two of many structures are shown in that figure, actually four of the same structures are used in this particular embodiment. The joystick 20a is affixed to a rod 134, which extends through an aperture 136 into the volume defined by the enclosure 100. The rod 134 terminates in a pivot point 138, which pivots on a switch base 140. The switch base 140 is secured to the enclosure 100 by four screws 142a–142d to several standoffs 144a–144d, which are physically annexed to the enclosure 100. The aperture 136 is sealed by an annular seal 146, the annulus of which fits snugly around the rod 134 and the outer edge of which is physically annexed to the enclosure 100 at the aperture by common methods.

The joystick 20a has a 14-degree freedom of motion about the pivot point; i.e., the rod 134 can move seven degrees from being perfectly perpendicular to the plane defined by the switch base 140 in virtually all directions. The rod 134 has four switch actuator arms 150a–150d physically annexed thereto. The actuator arms 148 are located proximate to four rubber dome momentary pushbutton switches 150a–150d, which are physically annexed to the switch base 140. The arms 148 and switches 150 are configured so that when the joystick 20a is displaced from the perpendicular, one or more of the arms 148 cause a closure event of their associated switches 150. Thus, motion of the joystick 20a is detected by closure events of the switches 150. In the alternative, the joysticks 20a, 20b can be implemented by other structures, such as potentiometer-based systems, which are well known in the art.

Figure 3:
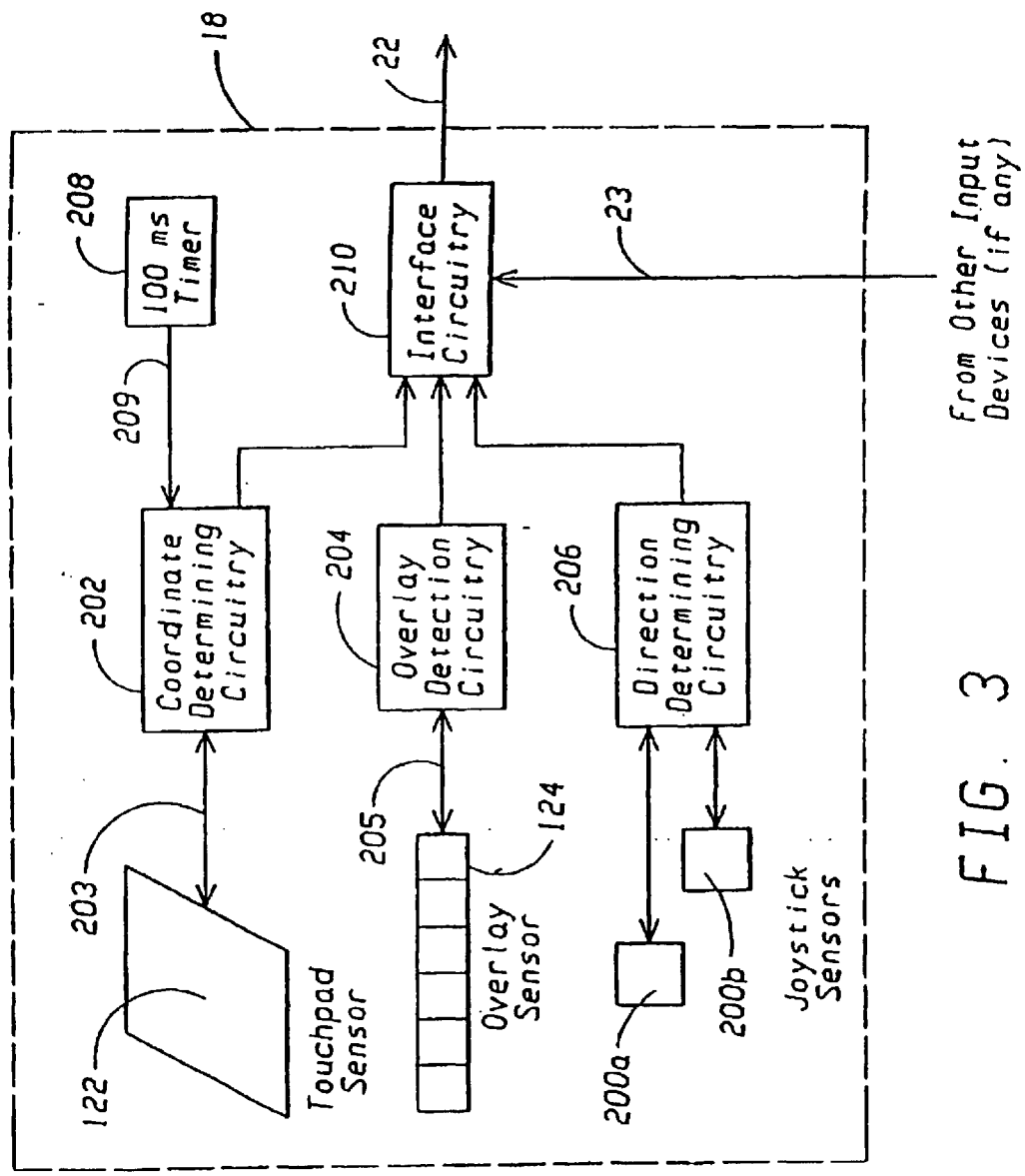
FIG. 3 is a block diagram showing the electrical circuitry of the input device of the present invention.

Referring now to FIG. 3, a block diagram of the circuitry within the input device 18 is shown. The input device 18 comprises the touchpad sensor 122, the overlay sensor 124, joystick sensors 200a, 200b, coordinate determining circuitry 202, overlay detection circuitry 204, a 100 millisecond timer 208, and interface circuitry 210, all connected in electrical circuit communication as shown in FIG. 3.

The coordinate sensor 122 and overlay sensor 124 are as described above in the text accompanying FIG. 2. The coordinate determining circuitry 202 is in circuit communication with the coordinate sensor 122, the interface circuitry 210, and the 100 millisecond timer 208. The coordinate determining circuitry 202 is configured to accept the electrical signals 203 from the coordinate sensor 122 and determine the X-axis and Y-axis values corresponding to the location of the touch by the finger, stylus 21, or the like. For example, if the coordinate sensor 122 is a switch-type sensor, then the coordinate determining circuitry 202 will comprise drivers and receivers to determine which switch is closed, as are well known in the art, and logic to translate the location of that switch to a meaningful value relative to the pad surface 110.

The overlay detection circuitry 204 is in circuit communication with the overlay sensor 124 and the interface circuitry 210. The overlay detection circuitry 204 accepts the electrical signal 205 from the overlay sensor 124 and generates a message corresponding to the identification pattern 108, or lack thereof, which is detected as the $000000_2$, as described above.

The direction determining circuitry 206 is in circuit communication with the joystick sensors 200a, 200b and the interface circuitry 210. The joystick sensors 200a, 200b comprise four rubber dome switches 150a–150d and the two joystick switches 130a, 130b, as described above. The direction determining circuitry generates a message based on closure events of these switches.

The 100 millisecond timer 208 is in electrical circuit communication with the coordinate determining circuitry 202. The timer 208 repeatedly determines the expiration of a 100 millisecond period of time and generates a signal 209 that indicates the expiration of the period. The coordinate determining circuitry 202 uses the signal 209 to detect a change in the touch location of the finger, stylus 21, or the like between expirations of the 100 millisecond periods detected by the timer 116.

The interface circuitry 210 is in circuit communication with the coordinate determining circuitry 202, the overlay detect circuitry 204, the data processing unit 12 (via the serial data line 22), and other input devices, if any, via the serial data line extension 23. The interface circuitry 210 accepts the coordinate values determined by the coordinate determining circuitry 202, the overlay message generated by the overlay detection circuitry 204, and the messages generated by the direction determining circuitry 206 and transmits any such information to the data processing unit 12 via the serial data link 22.

All input devices are daisy chained to the processing unit 12. Thus, the interface circuitry must pass any packets from other input devices on to the CPU 30. As will be explained more fully below, each input device connected to the processing unit 12 has a unique device number. The device closest to the processing unit 12 has a device number of 0, and the farther away from the processing unit 12 a device is, the higher its device number is. However, the input devices are not aware of their own or other devices' device numbers. Thus, each device must add one to the device number of any data packet passed from other input devices of the same type. Any input device in the chain with a device number greater than fifteen is ignored.

For example, assume that three input devices of the same type α, β, and γ are connected to the processing unit 12 as follows: α is connected to the processing unit 12, β is connected to α, and γ is connected to β. Therefore, α has a device number of 0, β has a device number of 1, and γ has a device number of 2. The other devices are not aware of their own or other device numbers. Each device sends its own data packets with a device number of 0.

When α passes a data packet to the processing unit 12, the default device number of 0 is correct, because α is closest to the processing unit 12. However, β and γ also send data packets with a device number of 0. To remedy the situation, each device adds one to the device number of packets passed on. Thus, when β passes a data packet from γ to α, β adds one to the device number, thereby giving the packet from γ a device number of 1. Likewise, when α passes the γ data packet to the processing unit 12, α adds one to the device number, thereby giving the packet from γ a correct device number of 2. Thus, each device in the chain adds one to the device number of each data packet from devices of the same type passed on to the next device.

Therefore, in addition to passing on data packets received from other input devices (if any), the interface circuitry 210 adds one to the device number in any data packets from devices of the same type received via the serial data line extension 23. The interface circuitry 210 passes the data packets with modified and unmodified device numbers to the data processing unit 12.

Using the system 10 with the input device 18 of the present invention is very straightforward. The input devices send data packets to the data processing unit 12 via the serial link 22. As mentioned above, the input devices interface to the CPU 30 via the I/O coprocessor 36. Each input device is daisy chained to the next input device. The I/O coprocessor 36 receives the data packets and stores them in a first-in-first-out (FIFO) manner.

Every 50 msec "tick" the I/O coprocessor 36 interrupts the CPU 30. In response, the CPU accesses the single byte at I/O port AS0 of the coprocessor 36 to determine the number of ticks since the last access by the CPU and the number of device messages to be transferred, as explained above. The ten types of device messages are shown in the table below.

TABLE

Input Device Message Structures

| Device Type | Byte 0 (Count) | Byte 1 (Device ID) (Bits 4–7) | Byte 1 (Device ID) (Bits 0–3) | Byte 2 | Byte 3 | Byte 4 |
|---|---|---|---|---|---|---|
| Keyboard (PS/2) | 2 | 0 | 0 | Scan Code | N/A | N/A |
| Mouse (PS/2) | 4 | 1 | 0 | Mouse Byte 1 (Buttons) | Mouse Byte 2 (X Data) | Mouse Byte 3 (Y Data) |
| Switch Closure | Variable 1–255 | Device Number in Chain | 1 | Button States 0: Open 1: Closed | Button States (Optional) | Button States (Optional) |
| Joystick (Digital) | 2 | Device Number in Chain | 2 | Switch Closure /Open Code | N/A | N/A |
| Coordinate (Relative) | 4 | Device Number in Chain | 3 | Button States | Delta X | Delta Y |
| Coordinate (Absolute) | 4 | Device Number in Chain | 4 | Button States | X Coord. | Y Coord. |
| Touchpad Overlay Message | 2 | Device Number in Chain | 5 | Overlay Code (0–63) | N/A | N/A |
| Action Message | Variable 1–255 | Device Number in Chain | 6 | Action Button Data | (Optional) | (Optional) |
| System Pass-through | Variable 1–255 | Device Number in Chain | 14 | Byte 0 | Byte 1 (Optional) | Byte 2 (Optional) |
| Initialization Message | Variable 1–255 | Device Number in Chain | 15 | Device Type (ID) | Mfg Code Byte 0 | Mfg Code Byte 1 (Optional) |

As seen in the table, the message structures are of different length and have structures closely related to the input devices to which they correspond. The device messages in the table are the same for the data sent to the I/O coprocessor from the individual I/O devices as the data sent to the CPU by the I/O coprocessor. In addition to the structures shown above, each message from an I/O device to the I/O coprocessor has a checksum to ensure uncorrupted data is sent from the input device 18 to the processor unit 12. The checksum is a standard modulo 256 checksum in which the checksum value is the value needed to make the sum of all the bytes zero (ignoring any carry during the summation). The I/O coprocessor strips off the checksums before sending the data to the CPU. Therefore, the stream of bytes read by the CPU is virtually identical to the stream of bytes received by the I/O coprocessor, with the following exceptions: (1) the first byte read by the CPU is the special byte containing the number of ticks and the number of I/O device messages and (2) the checksums are missing.

The PS/2 mouse and keyboard devices are supported as device type 0. The keyboard has a chain number of 0 and the mouse has a chain number of 1. These devices are supported by the I/O coprocessor using the existing PS/2 protocol via the serial data link 22.

This device type 1 is intended for devices with multiple buttons. Up to 255 bytes (8 buttons per byte) or 2040 buttons can be input to the system using this message type. Open buttons are sent as a logical ZERO while closed buttons are sent as a logical ONE. This is a variable length message.

Digital joysticks, such as joysticks 20a, 20b are supported as device type 2. There are two joysticks associated with each touchpad 19. Each Joystick has a unique chain number. Each left joystick is odd (1, 3, 5, 7, 9, etc.) and each right joystick is even (0, 2, 4, 6, etc.). Each joystick is reported independently. The message is a fixed length message. Recall that digital joystick. sensors comprise a number of switches 150a–150d. The message is a byte representing up to eight switches, which include the movement sensor switches 150a–150d and data input switches, such as switch 130a. The individual bits of the message byte for this type represent: up switch (MSB), down switch, left switch, right switch, switch #1, switch #2, switch #3, and switch #4 (LSB). The joysticks 20a, 20b included with the touchpad 19 each have only have-one button 130a, 130b, respectively, which corresponds to switch #1 above. The other three buttons are always reported as zero.

Coordinate devices such as mice and trackballs are reported as device type 3. The first byte following the ID is to report any button information for the device. Up to 8 buttons can be reported. The next byte is a delta X value followed by a delta Y value. The delta X and Y values are based on the last reported position of the device. The application programs must convert these values to absolute coordinates, if necessary. The maximum movement is 255. If the actual movement exceeds 255, then two or more messages will be sent. This is a fixed length message.

The touchpad 19 is supported as device type 4. Other devices in this device type include analog joysticks. The first byte following the ID is used to report button information. The next byte is used to report the absolute X position. The absolute Y position is next in sequence. The absolute X and Y values are each 1 byte and are limited to a range of 0–255. This is a fixed length message.

Touchpad overlays 102 are reported as device type 5. Touchpad overlays are sensed using the 6-bit sensor 124 in the touchpad. When an overlay change is sensed by the touchpad, a message is generated. All overlay codes are application-dependent and the application program must recognize the codes of each overlay. This message is a fixed length message.

The action message is used to define a common set of predefined device-independent functions that can be generated by multiple device types in different ways but are used and interpreted by the system and application programs in the same way. Action messages are reported as device type 6 using a variable length message. In this particular embodiment, three device-independent functions are defined and associated with the lower three bits of this byte: START (start an activity or process), PAUSE (pause an activity or process), and SELECT (select one of multiple events or actions), respectively. The bits are set to report these functions. All other bits are reserved for future use and are reported as zero to the CPU.

The system pass-through message type is used to handle any device types not applicable to any previously defined device types. Message type 14 is used. This is a variable length message. Definition of the data is device-dependent and is application specific. Each application must translate this type of message into the required functionality.

The first message from each device is device type 15. This is used to tell the system that a device will send input messages. This message also defines the future device type that will be used to report input. This is a variable length message.

On system power up and 50 ms intervals, the I/O coprocessor scans the cartridge and expansion sense lines to determine the configuration and alert the system and sends a configuration byte to the CPU. This is the first byte the CPU receives from the I/O coprocessor on power up. The I/O coprocessor will only generate a module configuration interrupt when a change is sensed; a change in cartridge status causes a system reset, thereby causing the I/O coprocessor to send another configuration byte to the CPU. The appropriate bits set in the byte sent are set to indicate the presence of the associated item: bit 0 corresponds to cartridge 1, bit 1 corresponds to cartridge 2, and bit 2 corresponds to the optional CD drive. The other bits are set to ZERO.

In addition, the CPU can transmit data to the I/O devices via the serial link 22 by writing the information to the I/O coprocessor 36. Data bytes are written to I/O port AS0 with each byte prefaced by the byte 03H. The I/O coprocessor writes these bytes to the I/O devices. This capability is used to send data to, for example, a printer (not shown).

Interfacing to the input device having two joysticks and a touchpad with an inscribed default template graphic image of the present invention is also straightforward. An interrupt handler executing on the CPU 30 from the system BIOS receives data from the input devices via the I/O coprocessor 36. The interrupt handler merely places any transmissions from the I/O coprocessor 36 into memory 33. Application programs executing on the CPU 30 poll the operating system BIOS periodically via a software interrupt to determine if any inputs were received. If so, they are communicated to the application programs by the operating system in response to the software interrupt.

The application programs monitor the current template. If the default template graphic image is detected (the overlay sensor 124 will detect all transmission-type identification patterns 108, i.e., $000000_2$), then the application program operates responsive to the default template. If, on the other hand, a template overlay 102 is detected, then the application program operates responsive to that particular template overlay 102.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, a QWERTY or other type of keyboard could be inscribed in or on the touchpad surface 100. As another example, the coordinate determining circuitry 202, overlay detection circuitry 204, joystick circuitry 206, 100 millisecond timer 208, and interface circuitry 210 can all be implemented in a single microcontroller. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A computer system comprising:
   (a) a central processing unit (CPU);
   (b) a memory circuit in circuit communication with said CPU;

(c) a video circuit in circuit communication with said CPU and said memory for generating an electrical signal corresponding to a visual image to be displayed on a video display device;

(d) a peripheral interface circuit in circuit communication with said CPU for interfacing signals from external I/O devices to said CPU wherein said peripheral interface circuit includes a data port for receiving device authorization data and device identification data from said I/O devices which together define a device authorization function;

(e) a pad surface exposed to allow contact by a finger, stylus, or the like;

(f) a retainer for removably securing a template overly proximate to said pad surface;

(g) a coordinate sensor proximate to said pad surface for generating at least one electrical signal responsive to a stylus, finger, or the like touching said pad surface or touching a template overlay proximate to said pad surface and said coordinate sensor configured such that said at least one electrical signal corresponds to the coordinates of the location touched;

(h) a rigid base proximate to said pad surface;

(i) coordinate determining circuitry in circuit communication with said coordinate sensor for determining the coordinates of the stylus, finger, or the like touching said pad surface or touching a template overlay proximate to said pad surface; and (j) interface circuitry in circuit communication with said coordinate determining circuitry and said peripheral interface circuit for communicating the determined coordinates thereto;

wherein the device identification data further comprises device symbol data, and the interface circuit is configured to change a first device symbol received from an external I/O device in circuit communication with the interface circuitry to a second device symbol and pass the second device symbol to the peripheral interface circuit; and wherein said pad surface has an inscribed default template graphic image associated therewith.

2. The computer system of claim 1 further comprising a video display device connected to said video circuit and operative to display the I/O device authorization data.

3. The invention as defined in claim 1 wherein said each device has a unique identification code.

4. The invention as defined in claim 3, wherein said unique identification code is a binary code.

5. The invention as defined in claim 4 wherein each device includes at least one optical sensor to generate said binary code.

6. The invention as defined in claim 5 wherein said optical sensor includes a series of optical openings.

7. The invention as defined in claim 1 wherein said device identification data is contained at least in part in a touchpad assembly.

8. The invention as defined in claim 1 wherein said device authorization data includes a selectable electronic signal.

9. The invention as defined in claim 8 wherein said selectable electronic signal is generated by a user.

10. The computer system as defined in claim 1 further comprising first and second I/O device joysticks in circuit communication with said interface circuitry, the joysticks having joystick circuitry associated therewith configured to generate joystick signals responsive to movements of said joysticks, wherein the first and second joysticks may each independently and simultaneously provide a complete positional input signal to the computer system.

11. An input device for use with a computer system having a central processing unit (CPU) enclosed in a central enclosure comprising:

a touchpad assembly having a pad surface and configured to generate touch location signals responsive to touches of said pad surface; and interface circuitry in circuit communication with said touchpad and configured to communicate to the CPU data packets corresponding to the locations of touches of said pad surface by a finger or stylus, wherein said interface circuitry is further configured to communicate unique I/O device authorization data and device identification data to the CPU which together constitute a device authorization function;

wherein the device identification data further comprises device symbol data, and the interface circuitry is configured to change a first device symbol received from an external I/O device in circuit communication with the interface circuitry to a second device symbol and communicate the second device symbol to the CPU.

12. The invention as defined in claim 11 wherein said each touchpad has a unique identification code.

13. The invention as defined in claim 12 wherein said unique identification code is a binary code.

14. The invention as defined in claim 13 wherein said touchpad assembly includes at least one optical sensor to generate said unique binary code.

15. The invention as defined in claim 14 wherein said optical sensor includes a series of optical openings.

16. The invention as defined in claim 11 wherein said device identification data is contained at least in part in said touchpad assembly.

17. The invention as defined in claim 11 wherein said device authorization data includes a selectable electronic signal.

18. The invention as defined in claim 17 wherein said selectable electronic signal is generated by a user.

19. The invention as defined in claim 11 further comprising first and second I/O device joysticks in circuit communication with said interface circuitry, the joysticks having joystick circuitry associated therewith configured to generate joystick signals responsive to movements of said joysticks, wherein the first and second joysticks may each independently and simultaneously provide a complete positional input signal to the computer system.

20. A method of operating a computer system comprising the steps of:

(a) providing a central processing unit (CPU);

(b) providing a memory circuit in circuit communication with said CPU:

(c) providing a video circuit in circuit communication with said CPU and said memory for generating an electrical signal corresponding to a visual image to be displayed on a video display device;

(d) providing a peripheral interface circuit in circuit communication with said CPU for interfacing signals from I/O devices external to said CPU wherein said peripheral interface circuit includes a data port for receiving device authorization data and device identification data from said I/O devices which together define a device authorization function;

(e) providing a pad surface exposed to allow contact by a finger, stylus, or the like;

(f) providing a retainer for removably securing a template overly proximate to said pad surface;

(g) providing a coordinate sensor proximate to said pad surface for generating at least one electrical signal responsive to a stylus, finger, or the like touching said pad surface or touching a template overlay proximate to said pad surface and said coordinate sensor configured such that said at least one electrical signal corresponds to the coordinates of the location touched;

(h) providing a rigid base proximate to said pad surface;

(i) providing coordinate determining circuitry in circuit communication with said coordinate sensor for determining the coordinates of the stylus, finger, or the like touching said pad surface or touching a template overlay proximate to said pad surface; and (j) providing interface circuitry in circuit communication with said coordinate determining circuitry and said peripheral interface circuit for communicating the determined coordinates thereto;

(k) providing device symbol data within the device identification data; and (l) the interface circuitry further configured to change a first device symbol received from an external I/O device in circuit communication with the interface circuitry to a second device symbol;

(m) the interface circuitry further configured to communicate the second device symbol to the peripheral interface circuit; and (n) operating said CPU from said peripheral device only responsive to the receipt of valid device authorization;

wherein said pad surface has an inscribed default template graphic image associated therewith.

21. The method of claim 20 further comprising a video display device connected to said video circuit and operative to display the I/O device authorization data.

22. The invention as defined in claim 20 wherein said each device has a unique identification code.

23. The invention as defined in claim 22 wherein said unique identification code is a binary code.

24. The invention as defined in claim 23 wherein each device includes at least one optical sensor to generate said unique binary code.

25. The invention as defined in claim 24 wherein said optical sensors include a series of optical openings.

26. The invention as defined in claim 20 wherein said device identification data is contained at least in part in a touch pad assembly.

27. The invention as defined in claim 20 wherein said device authorization data includes a selectable electronic signal.

28. The method as defined in claim 20, further comprising the steps of:

providing first and second I/O device joysticks in circuit communication with said interface circuitry;

providing circuitry associated with the joysticks configured to generate joystick signals responsive to movements of said joysticks; and each joystick independently and simultaneously providing a complete positional input signal to the computer system.

29. A method of operating a computer system having a central processing unit (CPU) from an input device comprising the steps of:

providing an input device touchpad assembly having a pad surface and configured to generate touch location signals responsive to touches of said pad surface;

providing an input device interface circuitry in circuit communication with said touchpad and configured to communicate to the CPU data packets corresponding to the locations of touches of said pad surface by a finger or stylus, wherein said interface circuitry is further configured to communicate unique I/O device authorization data and device identification date to the CPU which together constitute a device authorization function;

providing a device symbol within the device identification data for an external I/O device;

the interface circuitry further configured to change a first device symbol received from an external I/O device in circuit communication with the interface circuitry to a second device symbol;

the interface circuitry further configured to communicate the second device symbol to the CPU; and operating the CPU from said touchpad assembly only responsive to receipt of a valid authorization function.

30. The invention as defined in claim 29 wherein said selectable electronic signal is generated by a user.

31. The invention as defined in claim 29 wherein said touchpad assembly has a unique identification code.

32. The invention as defined in claim 31 wherein said unique identification code is a binary code.

33. The invention as defined in claim 32 wherein said touchpad assembly includes at least one optical sensor to generate said unique binary code.

34. The invention as defined in claim 33 wherein said optical sensor includes a series of optical openings.

35. The invention as defined in claim 29 wherein said device identification data is contained at least in part in said touchpad assembly.

36. The invention as defined in claim 29 wherein said device authorization data includes a selectable electronic signal.

37. The invention as defined in claim 36 wherein said selectable electronic signal is generated by a user.

38. The method as defined in claim 29, further comprising the steps of:

providing first and second I/O device joysticks in circuit communication with said interface circuitry;

providing circuitry associated with the joysticks configured to generate joystick signals responsive to movements of said joysticks; and each joystick independently and simultaneously providing a complete positional input signal to the computer system.

* * * * *